G. M. JESSEN.
SPEED AND DISTANCE INDICATOR.
No. 187,639. Patented Feb. 20, 1877.
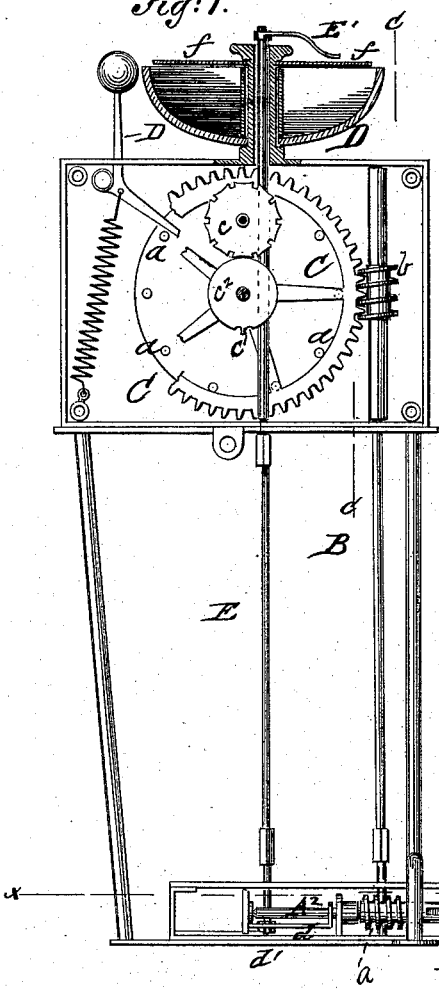
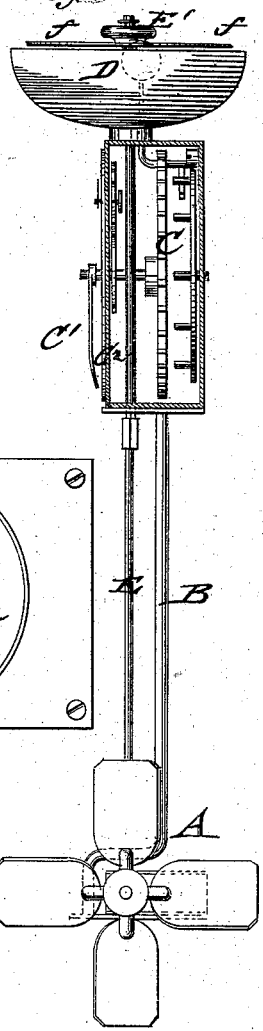
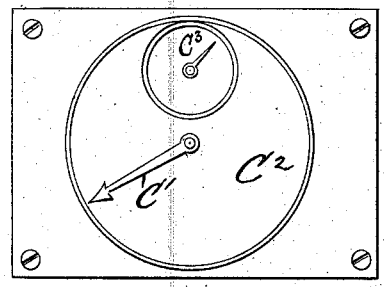
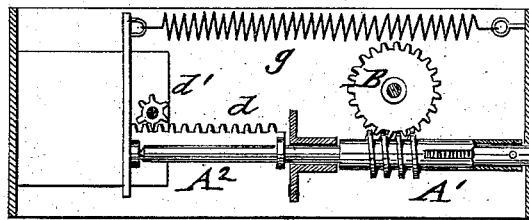

ness that a certain number of revolutions
UNITED STATES PATENT OFFICE.

GUSTAVUS M. JESSEN, OF PORTLAND, OREGON.

IMPROVEMENT IN SPEED AND DISTANCE INDICATORS.

Specification forming part of Letters Patent No. 187,639, dated February 20, 1877; application filed April 25, 1876.

*To all whom it may concern:*

Be it known that I, GUSTAVUS M. JESSEN, of Portland, in the county of Multnomah and State of Oregon, have invented a new and Improved Distance and Current Indicator for Hydrographic Surveys, of which the following is a specification:

In the accompanying drawing, Figure 1 represents a sectional side elevation of my improved distance and current indicating instrument for hydrographic surveys. Figs. 2 and 4 are, respectively, vertical transverse and horizontal sections of the same on the lines $c$ $c$ and $x$ $x$, Fig. 1; and Fig. 3 is a detail front view of the distance-indicating hands and dials.

Similar letters of reference indicate corresponding parts.

My invention has reference to a neat little instrument that is to be fastened to the outside of the boats for the purpose of enabling any one to take soundings at equal distance without the aid of a watch and experienced oarsmen. It serves, also, as a current-indicator and for the purpose of teaching the oarsmen to pull a steady stroke.

The invention consists of a small propeller, that is revolved by the forward motion of the boat, and so arranged with a suitable registering and bell mechanism as to indicate certain fixed distances for sounding. The sliding and spring-acted propeller-shaft works, also, a vertical shaft and index-hand on a top dial, to indicate stroke and current.

In the drawing, A represents a small propeller, that revolves by the forward motion of the boat and the resistance of the water, in suitable bearings of a supporting-frame attached to the outside of the boat, so that the propeller points forward, the shaft being parallel to the longitudinal axis of the boat. The shaft $A^2$ of the propeller A slides in a tubular sleeve, $A^1$, being connected thereto by slots and cross-pins, in such a manner that the shaft may slide backward and forward in the sleeve while simultaneously revolving with the same, so as to work by a worm-wheel of the sleeve a gear-wheel and transmitting-shaft, B, which meshes again, by a worm-wheel at the upper part, with a large gear-wheel, C, in such manner that a certain number of revolutions of the propeller-screw move the large wheel C a certain distance, which is indicated by an index-hand or pointer, $C^1$, keyed to its shaft on a graduated dial, $C^2$. A second smaller wheel, pointer, and dial register again the revolutions of the larger wheel, so as to produce a full record of the distance accomplished, said wheel $c$ being moved by the spur $c^1$ of the wheel $c^2$ striking the notches cut in the periphery of the same. The wheel $c^2$ is secured on the shaft that carries the wheel C.

The large indicating-wheel C operates, by means of spurs or pins $a$, a bell mechanism, D, which may be arranged to strike either at every hundred, two hundred, or more feet distance, according as frequent, or less frequent, soundings are required.

When the boat is pulled forward in the line in which the soundings are to be taken, the bell will indicate the exact moment at which the lead has to be heaved without the aid of a watch.

The rear part of the propeller-shaft $A^2$ works by a rack, $d$, attached to the same, a pinion, $d'$, of a second vertical shaft, E, that passes up through the center bell-supporting pillar or standard to the top part of the instrument, where a horizontal dial, $f$, is arranged, on which the index-hand $E'$ of shaft E vibrates forward and back. The rear part of the rack of the propeller-shaft $A^2$ is further acted upon by a spiral spring, $g$, that carries the propeller forward again after each stroke, while the forward motion of the boat at each stroke forces the propeller back, and causes the top hand to move over the top dial.

The greater or smaller distance to which the top hand is moved in consequence of the more or less powerful stroke of the oar shows the oarsman how to pull a steady stroke, by keeping the head of the dial as near as possible in one and the same position. This stroke-indicating hand may be made large enough to show plainly its movements to the oarsman, so that he may soon acquire the even stroke required for such surveys, which is a very important point in hydrographic surveys.

The instrument may also be employed with all classes of vessels when at anchor as a current-indicator, to observe the velocity of the current.

The instrument times the distances for the lead in regular manner, and is a check to inexperienced oarsmen, teaching them soon to become efficient, and furnishing a device of great usefulness in hydrographic surveying.

Having thus described my invention, I claim as new and desire to secure by Letters Patent—

1. A distance and current indicating instrument for hydrographic surveys, consisting of an actuating revolving propeller, in connection with a distance registering and indicating dial and bell mechanism, and with a simultaneously-operated stroke and current-measuring device, substantially in the manner and for the purpose set forth.

2. The propeller A, shaft $A^2$, tubular sleeve $A^1$, having gear-wheel $a$, spring $g$, shaft B, having worm-wheel $b$, cog-wheel C, dial $C^2$, index-hand $C^1$, wheel $c^2$, having spur $c^1$, notched wheel $c$, and dial $C^3$, the whole constructed, combined, and arranged to indicate power of current and stroke of the oar, substantially as described.

3. In a distance-indicating device for hydrographic surveys, the combination of a revolving propeller with distance-indicating dials and hands, and a bell mechanism striking at fixed distances, substantially in the manner and for the purpose set forth.

GUSTAVUS M. JESSEN.

Witnesses:
W. F. BASSETT,
RICHD. M. TABOR.